Sept. 26, 1961  M. C. CREUSERE ET AL  3,001,718
RADAR RANGE CONVERTER

Filed March 22, 1956  3 Sheets-Sheet 1

INVENTORS
MELVILLE C. CREUSERE
JOHN H. GREGORY
BY
ATTORNEYS

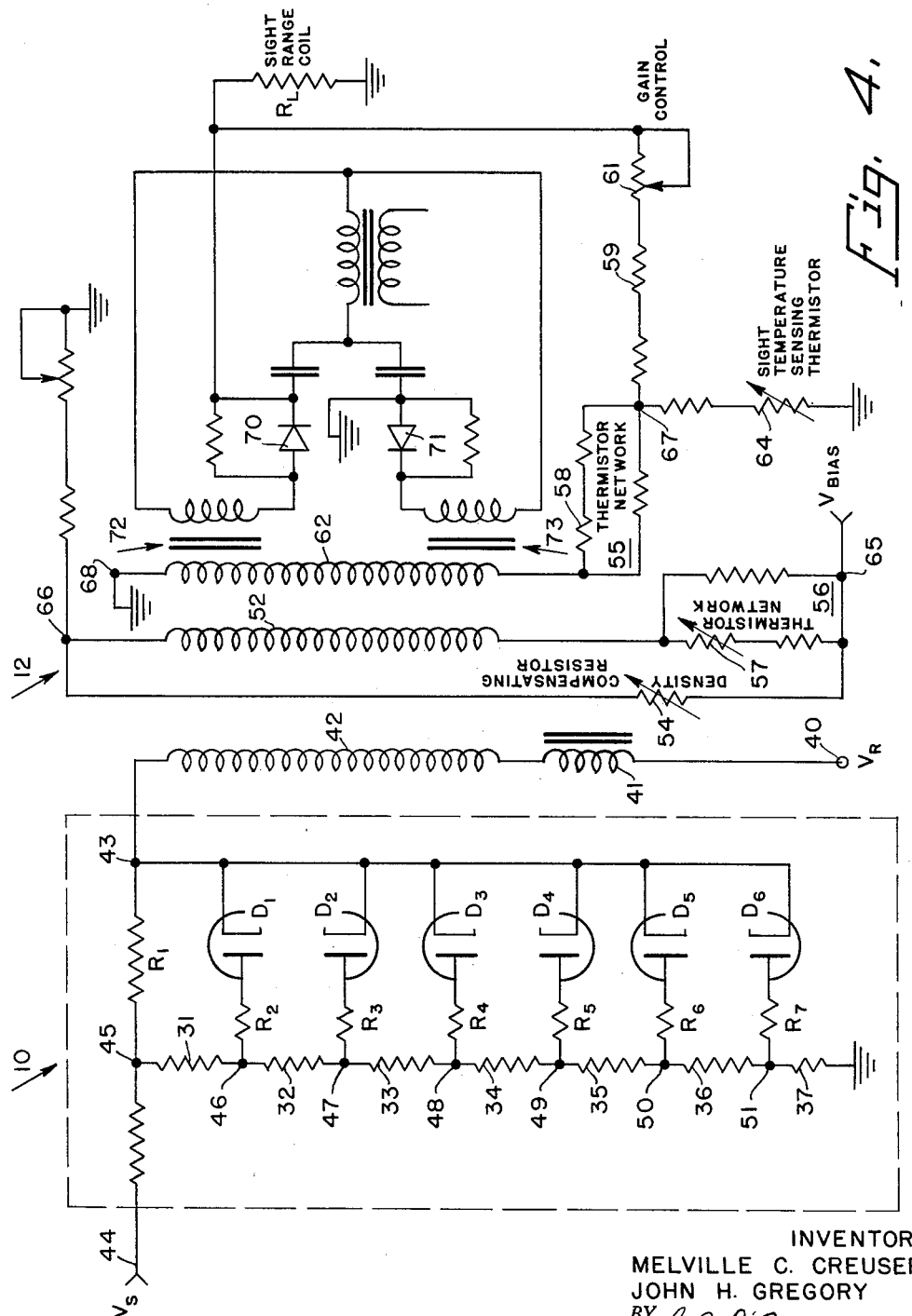

United States Patent Office 3,001,718
Patented Sept. 26, 1961

3,001,718
RADAR RANGE CONVERTER
Melville C. Creusere and John H. Gregory, China Lake, Calif., assignors to the United States of America as represented by the Secretary of the Navy
Filed Mar. 22, 1956, Ser. No. 573,303
7 Claims. (Cl. 236—61.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a data converter circuit and particularly to a radar range data converter circuit for use with aircraft fire control systems.

The general purpose of this invention is to receive a voltage from a range only radar proportional to the range of an aerial target and to provide a current to an aircraft gyro computing sight which is a function of this range, and which is also a function of the aircraft altitude and the sight temperature, to cause displacement of the sight aiming pip such that a pilot may score hits on a target.

The former method for performing the operations described involved the use of a servo in which the voltage from a nonlinear potentiometer mounted on the output shaft was compared with the radar range input voltage. The error, or difference, was amplified and used to operate a sensitive relay which in turn controlled the direction of rotation of the servo motor. Another potentiometer was on the output shaft as part of a resistance network to which a regulated voltage was supplied, and which controlled the current supplied to the sight unit. This old method was troubled by lack of reliability; the device also was heavier, required more space than, and was not as sensitive as the present invention.

An object of the present invention is to provide a circuit for supplying to an aircraft gyro computing sight a current which is a combined function of a radar range signal, aircraft altitude and sight temperature so as to cause a displacement of an aiming pip in the sight such that a pilot may score hits on a target.

Another object is to provide an improved radar range data converter which is reliable, accurate, compact and lightweight.

A further object is to provide a voltage from a range only radar which is proportional to the range of an aerial target and to provide current to an aircraft gyro computing sight which is a function of said range.

Other objects and many of the attendant advantages of this invention will be readily appreciated as the same become better understood by reference to the following detailed description when considered in connection with the accompanying drawings wherein:

FIG. 4 is a schematic diagram of the data converter of the present invention.

Figure 1:
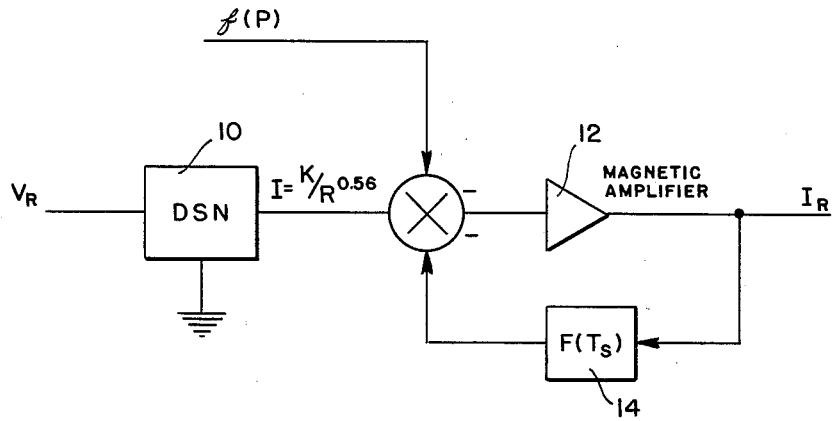
FIG. 1 is a simplified block diagram of the radar range data converter of the present invention.

The operation of the circuit of this invention can be visualized with the aid of the simplified block diagram of FIG. 1. The radar range voltage, $V_R$, is applied to a diode shaping network 10. The output of the shaping network 10 is a current which is approximately proportional to $1/R^{0.56}$ (where R represents the range), and which is applied to the input of a magnetic amplifier 12. A function of altitude, $f_{(p)}$, is applied as a bias to provide an approximate correction for the effect of altitude on ballistics of a round of ammunition. The gain of amplifier 12 is controlled as a function of ambient temperature of the sight unit, not shown, by means of a feedback resistor network 14 incorporating a temperature sensing thermistor mounted in the sight unit.

Figure 2A:
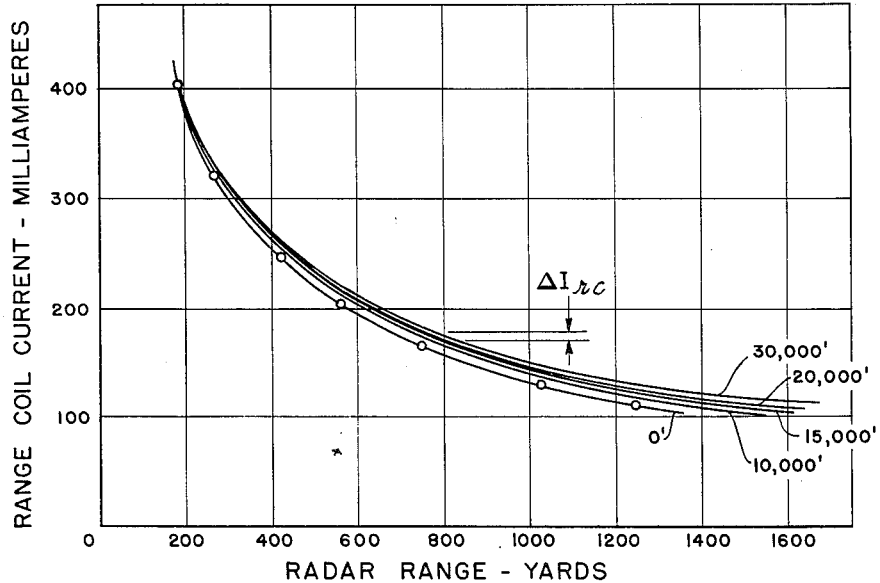
FIG. 2A shows curves of range coil current as a function of radar range.
Figure 2B:
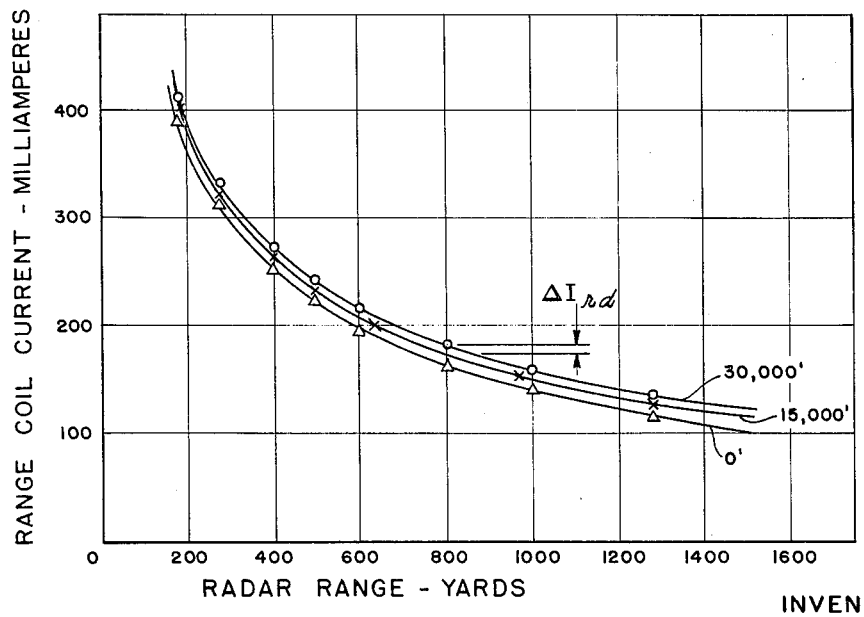
FIG. 2B shows curves of range coil current actually supplied by the data converter as a function of radar range.

For a given sight and for given ballistics functions, a group of curves of required range coil current as a function of range voltage for various altitudes may be derived, such curves are shown in FIG. 2A. In order to compensate for density effects, some attempt must be made to make the curves shaped approximate those of FIG. 2A for the various altitudes considered. In the data converter the approximation is made by shifting the shaped curve up and down by means of a bias adjustment of the magnetic power amplifier 12. The actual approximating curves thus obtained are those shown in FIG. 2B. In calibrating past data converters, 800 yards radar range was selected as a point to strive for maximum accuracy, and the density compensation was adjusted to be most accurate at this range. This was done by making $I_{rd}$ in FIG. 2B equal to $I_{rc}$ in FIG. 2A. It can be seen that the percentage error will increase rapidly with range as the radar range increases because of the rapidly increasing slowdown of the round, but as the range decreases the error in density compensation will be negligible since both the steepness and magnitude of the curve increases while the absolute amount of density compensation remains constant. The equivalent range error of this density compensation approximation is shown as a function of range in Table I. Since the accuracy of the radar is ±20 yards, the accuracy of density compensation is considered quite adequate.

TABLE I

Equivalent range errors caused by density compensation method

| Radar Range in Yards | Range Errors in Yards at Altitudes of— | | | |
|---|---|---|---|---|
| | 0 Feet | 10,000 Feet | 20,000 Feet | 30,000 Feet |
| 200 | −10 | −3 | +3 | +6 |
| 400 | −15 | −2.5 | +5 | +5 |
| 600 | −10 | −5 | +5 | +15 |
| 800 | 0 | 0 | 0 | 0 |
| 1,000 | +17.5 | +9 | −9 | 0 |
| 1,200 | +40 | +20 | −10 | −10 |

Figure 3:
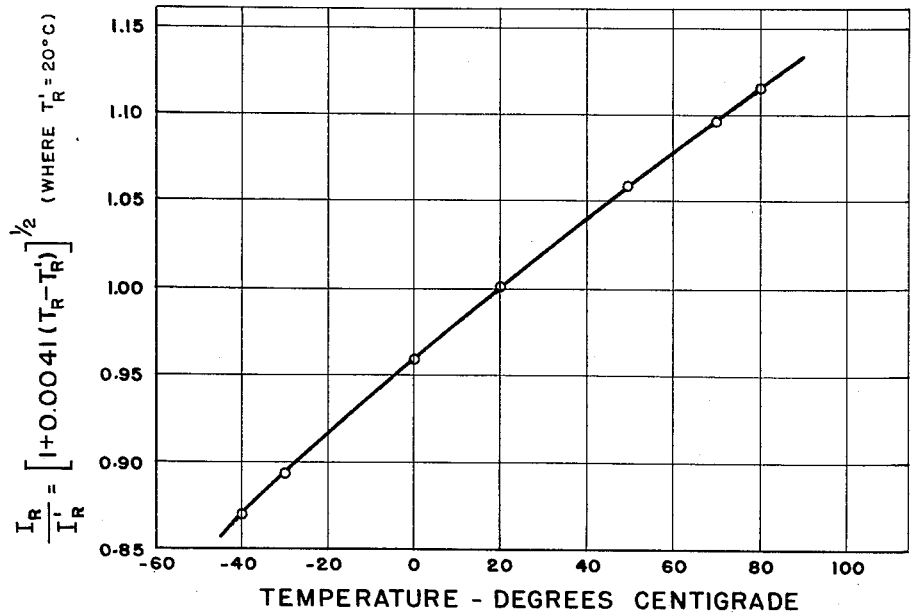
FIG. 3 is a graph of the ratio of desired range coil current to current at 20° C. as a function of sight temperature.

In aircraft gyro computing sights a variation in the sight sensitivity due to variations in temperature must be compensated for. This can be accomplished by varying the data converter output current as a function of sight temperature as illustrated in FIG. 3. In the data converter, a change in range coil temperature will cause a variation in output current for a given input voltage through its effect on range coil resistance. Thus, the compensation added in the data converter must override the tendency of an increase in temperature to cause a decrease in output current, as well as to provide an increase in output current to compensate for the increase in resistivity of the sight eddy current dome.

The method by which this is accomplished in the present invention is shown in FIG. 1. The resistor network 14 is put in a negative voltage feedback loop of the output magnetic amplifier 12. Network 14 contains a thermistor which senses the temperature in the sight. The actual circuit elements involved are shown in the more complete diagram of FIG. 4. An increase in sight temperature causes a decrease in negative feedback and thus an increase in amplifier gain. This increase in gain provides sufficient increase in voltage output to overcome the increased winding resistance caused by temperature increase, and provide an increased current to compensate for the sight dome resistaince increase.

The sight temperature after a certain warmup has been allowed will vary over relatively small limits since the sight is mounted in the aircraft cockpit, and the cockpit is kept within relatively small ambient temperature limits.

The actual circuit of the present invention is shown in FIG. 4. The purpose of the thermistor networks 56 and 55 in series with the bias and feedback windings 52 and 62 respectively is to maintain a constant resistance, between points 65 and 66, and 67 and 68 respectively, in the branches of the sight temperature and density compensating networks and thus obtain current division which is unaffected by variations in ambient temperature. Resistor 61 in the negative feedback circuit is used as a gain control.

Referring still to the diagram of FIG. 4, it can be seen that the radar range voltage, $V_R$, is applied at input 40. Since the resisitance of the series choke 41 and control winding 42 are negligible compared to those of the diode shaping network 10, the voltage at point 43 will be essentially that at input 40. For example a voltage, $V_S$, is applied to the network at 44, and by virtue of the low current flowing through the control winding 42 in comparison to that flowing through the bleeder string of resistors 31, 32, 33, 34, 35, 36 and 37, the voltages at points 45, 46, 47, 48, 49, 50 and 51 are relatively constant over the range of control winding currents. These voltages serve to establish biases on the various diodes $D_1$, $D_2$, $D_3$, $D_4$, $D_5$ and $D_6$, and their conduction or nonconduction depends on whether or not the voltage at points 43 is below the voltage of the diode bias point. From FIG. 4 it can be seen that when the voltage at point 43 (or 40) is above the voltage of point 46, none of the diodes will conduct, and one will obtain a linear variation of control winding current with input voltage. However, as soon as the voltage at point 43 falls below that at point 46, current will flow through diode $D_1$ and resistor $R_2$, adding to that current which flows through resistor $R_1$ and causing the control current to increase more rapidly with a decrease in radar range voltage. As the voltage at 43 decreases the diodes $D_2$, $D_3$, $D_4$, $D_5$ and $D_6$ successively start conducting and each time the slope of the curve increases. Thus, a nonlinear voltage vs. current curve is obtained of the type necessary to approximate the desired curves as shown in FIG. 2

Briefly, the principle of operation of the diode shaping network 10 may be expressed as follows: the current which is allowed to flow thru the magnetic amplifier input windings is dependent on radar range voltage $V_R$. If this voltage is low, all the diodes will be conducting, but as the voltage, $V_R$, is increased the diodes will stop conducting one by one depending on the bias voltage on their anodes. When a diode changes its conduction condition, the resistance in series with the winding 42 effectively changes thus changing the slope of the approximating curve. The straight line segments of the matching curve may be made to coincide relatively closely with the desired matching curve by controlling the bias voltage on each diode, and the diode series resistance.

The network, as illustrated, shows use of vacuum tube diodes, but silicon diodes may also be used thereby eliminating the need for filament power and allowing an even more compact circuit.

The current obtained from the shaping network 10 is rather small at its maximum value, and in order to increase the current to the amount necessary for the aircraft gyro computing sight, the magnetic amplifier 12 is used. In the diagram the sight range coil resistance is represented by $R_L$. The magnetic amplifier 12 is of fairly standard design, except that some computing functions have been incorporated. Thus, density compensation is obtained by shunting the negative bias winding 52 of the amplifier by a resistance 54 which is varied by an aneroid unit or the like, not illustrated. At sea level this resistance is infinite and its value decreases rapidly with altitude, shunting current around the bias winding 52, and thus decreasing the degative bias and increasing the output current of the amplifier. The output current may be increased by just the proper amount to provide altitude compensation by controlling the value of the series resistance network 56 of the bias winding.

Sight temperature compensation is accomplished by shunting the negative feedback winding 62 by a thermistor 64, wherein the thermistor is mounted in the sight and senses the sight temperature. By proper selection of network resistance values, the increase in sight temperature decreases the thermistor resistance, shunting some of the feedback current around the winding 62 and causing an increase in magnetic amplifier gain which approximates that shown in FIG. 3.

Thermistor 57 in network 56, thermistor 58 in network 55, and resistor 59 compensate for temperature (ambient) effects on the data converter components, especially the slenium rectifiers, 70 and 71, and magnetic amplifier cores, 72 and 73. In addition, thermistors 57 and 58 serve to keep the network resistances seen by the density compensator resistance 54 and the sight thermistor 64 constant so that the corrections will not be affected by the variation of winding resistances with temperature.

Obviously, many modifications and variations of the present invention are possible in the light of the above teachings. It is therefore to be understood that within the scope of the appended claims the invention may be practiced otherwise than as specifically described.

What is claimed is:

1. A data converter adapted to receive a voltage proportional to the range of an aerial target as supplied by a range-only radar and to provide a current to a computing sight which is a function of said range, said data converter comprising a diode shaping network to which a voltage from the range-only radar is applied and a magnetic amplifier for amplifying the output from said shaping network, means to apply a bias current which is a function of altitude to said magnetic amplifier, means to vary the gain of said amplifier as a function of the temperature of said sight, whereby the output of said magnetic amplifier which provides current to said computing sight will reflect the combined functions of range, altitude and temperature.

2. A data converter adapted to receive a voltage proportional to the range of an aerial target as supplied by a range-only radar and to provide a current to a computing sight which is a function of said range, said data converter comprising a diode shaping network to which the voltage from the range-only radar is applied and a magnetic amplifier, means to apply the output of said diode shaping network to the input of said magnetic amplifier, means to apply a bias voltage which is a function of altitude to said magnetic amplifier, and means to vary the gain of said amplifier by means of a thermistor mounted in said sight and whose resistance is a function of the temperature of said sight whereby the output of said magnetic amplifier which provides the current to said computing sight will reflect the combined functions of range, altitude and temperature.

3. A data converter adapted to receive a voltage proportional to the range of an aerial target as supplied by a range-only radar and to provide a current to a computing sight which is a function of said range, said data converter comprising a diode shaping network to which a voltage from the range-only radar is applied and a magnetic amplifier for amplifying the output from said shaping network, said magnetic amplifier having an input winding, a negative bias winding and a negative feedback winding a variable resistor shunting said negative bias winding and having means to vary its resistance so as to apply a bias voltage which is a function of altitude to said magnetic amplifier, and means to vary the gain of said magnetic amplifier as a function of the temperature of said sight through the effect of a thermistor in the current feedback circuit to said negative feedback winding and shunting said negative feedback winding, said thermistor in said feedback circuit being mounted in the sight for sensing the sight temperature whereby the output of said magnetic amplifier which provides current to said computing sight will reflect the combined functions of range, altitude and temperature.

4. A data converter adapted to receive a voltage proportional to the range of an aerial target as supplied by a range-only radar and to provide a current to a computing sight which is a function of said range, said data converter comprising a diode shaping network to which a voltage from the range-only radar is applied and a magnetic amplifier for amplifying the output from said shaping network; said diode shaping network comprising an input-output terminal, a ground terminal and a terminal for applying a bias voltage, a resistor connected between said input-output terminal and said bias voltage terminal, a plurality of bias resistors connected in series between said bias voltage terminal and said ground terminal, each junction point between said series connected bias resistors being connected to one end of one of a plurality of diode resistors, the other end of each diode resistor being connected to the anode of one of an equal number of diodes, the cathodes of said diodes all being connected to said input-output terminal, whereby when the diode shaping network input voltage is low all the diodes will conduct, but as the voltage increases the diodes will stop conducting one by one depending on the bias voltage on their anodes; means to apply a bias voltage which is a function of altitude to said magnetic amplifier, and means to vary the gain of said amplifier as a function of temperature of said sight, whereby the output of said magnetic amplifier which provides current to said computing sight will reflect the combined functions of range, altitude and temperature.

5. A data converter adapted to receive a voltage proportional to the range of an aerial target as supplied by a range-only radar and to provide a current to a computing sight which is a function of said range, said data converter comprising a diode shaping network to which a voltage from the range-only radar is applied and a magnetic amplifier for amplifying the output from said shaping network; said magnetic amplifier having an input winding to which an input signal is applied, a negative bias winding and a negative feedback winding, a first thermistor network sensitive to temperature connected in series with said negative bias winding between said negative bias winding and a source of bias voltage, a variable resistor shunting said negative bias winding and said first thermistor network and having means to vary its resistance so as to apply a bias voltage which is a function of altitude to said magnetic amplifier, a second thermistor network sensitive to temperature being connected in series with said negative feedback winding, means to vary the gain of said amplifier as a function of temperature of said sight through the effect of a thermistor in the current feedback circuit to said negative feedback winding, said temperature sensing thermistor shunting said negative feedback winding and said thermistor network and being mounted in said sight for sensing sight temperature, said first and second thermistor networks in series with said negative bias winding and said negative feedback winding respectively being such as to compensate for the effects of changes in ambient temperature on the resistance of said windings, whereby the output of said magnetic amplifier which provides current to said computing sight will reflect the combined functions of range, altitude and temperature.

6. A data converter adapted to receive a voltage proportional to the range of an aerial target as supplied by a range-only radar and to provide a current to a computing sight which is a function of said range, said data converter comprising a diode shaping network to which a voltage from the range-only radar is applied and a magnetic amplifier for amplifying the output from said shaping network; said diode shaping network comprising an input-output terminal, a ground terminal and a terminal for applying a bias voltage, a resistor connected between said input-output terminal and said bias voltage terminal, a plurality of bias resistors connected in series between said bias voltage terminal and said ground terminal, each junction point between said series connected bias resistors being connected to one end of one of a plurality of diode resistors, the other end of each diode resistor being connected to the anode of one of an equal number of diodes, the cathodes of said diodes all being connected to said input-output terminal, whereby when the diode shaping network input voltage is low all the diodes will conduct, but as the voltage increases the diodes will stop conducting one by one depending on the bias voltage on their anodes; said magnetic amplifier having an input winding to which an input signal is applied, a negative bias winding and a negative feedback winding, a first thermistor network sensitive to temperature connected in series with said negative bias winding between said negative bias winding and a source of bias voltage, a variable resistor shunting said negative bias winding and said first thermistor network and having means to vary its resistance so as to apply a bias voltage which is a function of altitude to said magnetic amplifier, a second thermistor network sensitive to temperature being connected in series with said negative feedback winding, means to control the gain of said amplifier as a function of the temperature of said sight through the effect of thermistor in the current feedback circuit to said negative feedback winding and shunting said negative feedback winding and said second thermistor network, said thermistor in said current feedback being mounted in said sight for sensing sight temperature, said first and second thermistor networks in series with said negative bias winding and said negative feedback winding respectively being such as to compensate for the effects of changes in ambient temperature on the resistance of said windings, whereby the output of said magnetic amplifier which provides current to said computing sight will reflect the combined functions of range, altitude and temperature.

7. An electrical device comprising a magnetic amplifier in combination with a diode shaping network, said magnetic amplifier having a variable resistive feedback network and a variable resistive bias network, said diode shaping network serving to modify a first input voltage to cause an input current which is a particular function of said input voltage to flow to said magnetic amplifier, said input current being amplified by said magnetic amplifier to produce an output, the amplification of said magnetic amplifier being controlled by said resistive feedback network, said resistive feedback network comprising a plurality of fixed resistors in combination with a variable resistor whose resistance is varied by a second input, the output of said feedback network being applied to a feedback winding on said magnetic amplifier, the output level of said magnetic amplifier being varied by a fixed amount by the current through a bias winding, said bias winding current being controlled by said resistive bias network which is comprised of a plurality of fixed resistors and a variable resistor whose resistance is varied by a third input.

References Cited in the file of this patent

UNITED STATES PATENTS

| | | |
|---|---|---|
| 2,104,336 | Tuttle | Jan. 4, 1938 |
| 2,434,155 | Haynes | Jan. 6, 1948 |
| 2,548,049 | Olson | Apr. 10, 1951 |
| 2,581,124 | Moe | Jan. 1, 1952 |
| 2,624,510 | La Coste | Jan. 6, 1953 |
| 2,663,832 | McDonald et al. | Dec. 22, 1953 |
| 2,730,574 | Belsey | Jan. 10, 1956 |
| 2,733,006 | Babcock | Jan. 31, 1956 |
| 2,744,683 | Gray | May 8, 1956 |
| 2,831,160 | Guth | Apr. 15, 1958 |

OTHER REFERENCES

Geyger: Magnetic-Amplifier Circuits; McGraw-Hill 1954, chapt. 7 and particularly FIG. 7.2(b), p. 98 relied on.

Korn and Korn: Electronic Analog Computers; McGraw-Hill 1952 (1st edition), chapt. 6, sec. 6.7 and particularly pps. 674–678 relied on.